(12) United States Patent
Huang et al.

(10) Patent No.: US 7,729,109 B2
(45) Date of Patent: Jun. 1, 2010

(54) DEVICE WITH CONNECTING MEMBER HAVING AN ELASTIC RING

(75) Inventors: Wen-Hung Huang, Tucheng (TW); Chih-Ming Chu, Taipei (TW)

(73) Assignee: Hannspree, Inc., Taipei (TW)

( * ) Notice: Subject to any disclaimer, the term of this patent is extended or adjusted under 35 U.S.C. 154(b) by 184 days.

(21) Appl. No.: 12/219,872

(22) Filed: Jul. 30, 2008

(65) Prior Publication Data

US 2009/0296333 A1 Dec. 3, 2009

(30) Foreign Application Priority Data

May 30, 2008 (TW) .............................. 97120004 A

(51) Int. Cl.
*G06F 1/16* (2006.01)
(52) U.S. Cl. .................. 361/679.21; 446/484; 132/294; 210/170.03; 403/327
(58) Field of Classification Search ................. 132/294, 132/275; 446/484, 8; 482/126; 16/250, 16/340, 337; 210/516, 170.03, 130; 29/235, 29/894.3, 469; 403/327; 361/679.21, 679.06, 361/679.27, 679.29, 679.3
See application file for complete search history.

(56) References Cited

U.S. PATENT DOCUMENTS

| | | | |
|---|---|---|---|
| 5,637,066 A * | 6/1997 | Chang | 482/126 |
| 6,311,701 B1 * | 11/2001 | Yuhara et al. | 132/294 |
| 2009/0176432 A1 * | 7/2009 | Hardin et al. | 446/8 |
| 2010/0041312 A1 * | 2/2010 | King et al. | 446/484 |

* cited by examiner

*Primary Examiner*—Hung V Duong
(74) *Attorney, Agent, or Firm*—Bacon & Thomas, PLLC

(57) ABSTRACT

The present invention discloses a device with connecting member having an elastic ring, and the device includes a body having at least one accommodating cavity on the body and an exhaust opening on the internal periphery of each accommodating cavity; and at least one connecting member having an insert unit at an end of each connecting member, at least one positioning block at the periphery of the insert unit and at least one elastic ring sheathed onto the periphery of the insert unit, such that if the connecting member is inserted into the accommodating cavity, the shape of the accommodating cavity can accommodate the insert unit and each positioning block precisely.

8 Claims, 3 Drawing Sheets

DEVICE WITH CONNECTING MEMBER HAVING AN ELASTIC RING

FIELD OF THE INVENTION

The present invention relates to a device with connecting member having an elastic ring, and more particularly to a display device having a connecting member that can be assembled to the device or detached from the device easily and conveniently, which can greatly enhance the production and assembling efficiency. It also simplifies the assembling procedure for the manufacturer, and improves convenience of assembling or replacing the body and the connector for the user.

BACKGROUND OF THE INVENTION

In recent years, our living standard becomes increasingly higher, and thus the needs of household appliances such as display devices and other electronic devices are no longer the same anymore. Nowadays the user not only pursue a multiple of functions with lower price, but also emphasize on the stylish appearance of the device, so that each device can satisfy personal visual needs as well as providing a convenient use. To cope with the market trend, manufacturers spare no effort to make changes and improvements to the stylish design of the device, in the hope of designing a device more appealing to consumers to gain market share effectively.

In order to meet the visual needs, manufacturers have to introduce new device with innovative appearances from time to time to keep up with the market trend. If a device is manufactured and integrated as a whole, manufacturers have to produce a brand new mold to manufacture the device with an innovative stylish design, and therefore incurring higher costs for the design and production cost of the device. Furthermore, the device may have an innovative look, but consumers cannot change the appearance of the object freely as needed since the device is produced as a whole device. If any external part (such as a support) of the device is damaged, consumers cannot replace the damaged part separately and easily. Therefore, such prior art not only causes tremendous inconvenience to the user, but also limits the appearance to a fixed design that may bored the user after a long use.

To overcome the foregoing drawbacks, some manufacturers conducted researches and developed a mechanism for a device with connecting member having an elastic ring, and the device includes a body and at least one connecting member, wherein the body is a display device and the connecting member is a support of the display device adopted in a preferred embodiment of the present invention for illustrating the invention. A prior art shown in FIG. 1, the body 10 includes at least one threaded hole 100, and an end of each support 11 includes a threaded rod 110, so that a user can align the end of threaded rod 110 to the position of the threaded hole 100 and connect the support 11 to the body 10 by screwing the threaded rod 110 into the threaded hole 100. If a user needs to replace or change the support 11 to another design or shape, the user should hold the support 11 and unscrews the threaded rod 110 from the threaded hole 100 to complete the process of removing the support 11 from the body 10.

As to manufacturers and users, this type of devices with connecting member still has the following major drawbacks:

(1) In a process of assembling a device with connecting member by manufacturer or user, it is necessary to align the end of threaded rod 110 at the precise position of the threaded hole 100 and keep turning the support 11 in a direction to screw the threaded rod 110 into the threaded hole 100 for installing each support 11 onto the body 10. However, manufacturer or user not only consume much time on connecting the support 11 to the body 10, but also require to apply sufficient force to securely fix the support 11 and the body 10 together. Therefore, the process of assembling the device with a support incurs relatively long manufacturing time and extra production cost to manufacturer and relatively inconvenient assembly, repair and maintenance for the user.

(2) Since the support 11 and the body 10 are assembled with each other by screwing the support 11 with respect to the body 10. If the support 11 and the body 10 come with a design in a specific direction, then manufacturers have to design the support 11 and the body 10 for complying with the direction of the threaded rod 110 and the threaded hole 100 precisely. The level of difficulty for the production and design becomes higher for the manufacturers, so that the manufacturing cost cannot be lowered effectively and the market competitiveness may be affected adversely. Furthermore, the level of difficulty for the assembling process causes tremendous inconvenience to the user.

Therefore, an objective of the present invention is to find a way of designing and providing an innovative device with connecting member having an elastic ring to effectively reduce the assembling time for the user and manufacturer. Another objective of the present invention is to complete the assembling process of the device with the connecting member in a correct direction is an important subject of the present invention.

SUMMARY OF THE INVENTION

In view of the shortcomings of the prior art, the inventor of the present invention based on years of experience in the related industry to conduct extensive researches and experiments, and finally developed an device with connecting member having an elastic ring in accordance with the present invention to effectively overcome the drawbacks of the long assembling time, high manufacturing cost and inconvenient repair. The invention can also save production and design costs for designing related components precisely to assure a correct direction of installing the device with the connecting member during the manufacturing process of the device.

Therefore, it is a primary objective of the present invention to provide a device with connecting member having an elastic ring, and the device (such as a display device and any other electronic device) includes a body and at least one connecting member. Each connecting member has an insert unit disposed at an end of the connecting member and at least one positioning block disposed at the periphery of the insert unit, wherein the insert unit and each positioning block are inserted into at least one accommodating cavity of the body, and the insert unit includes at least one elastic ring sheathed around the periphery of the insert unit, and the connecting member is securely inserted into the accommodating cavity through each elastic ring of the insert unit, and an exhaust opening is disposed on the internal periphery of each accommodating cavity, such that when the connecting member is inserted into the accommodating cavity, the air in the accommodating cavity is discharged to the outside through the exhaust opening, and the connecting member can be inserted into the accommodating cavity successfully. The user and manufacturer can use the positioning block to assure a correction direction of assembling the body with each connecting member and this invention allows user and manufacturer to assemble or disassemble easily, so greatly enhance the production and assembling efficiency, simplify the assembling procedure for manufacturer, and more convenience of assembling and replacing for the body and the connecting member.

To make it easier for our examiner to understand the shape, structure, design principle and performance of the present invention, we use preferred embodiments together with the attached drawings for the detailed description of the invention as follows:

DETAILED DESCRIPTION OF THE PREFERRED EMBODIMENTS

Figure 1:
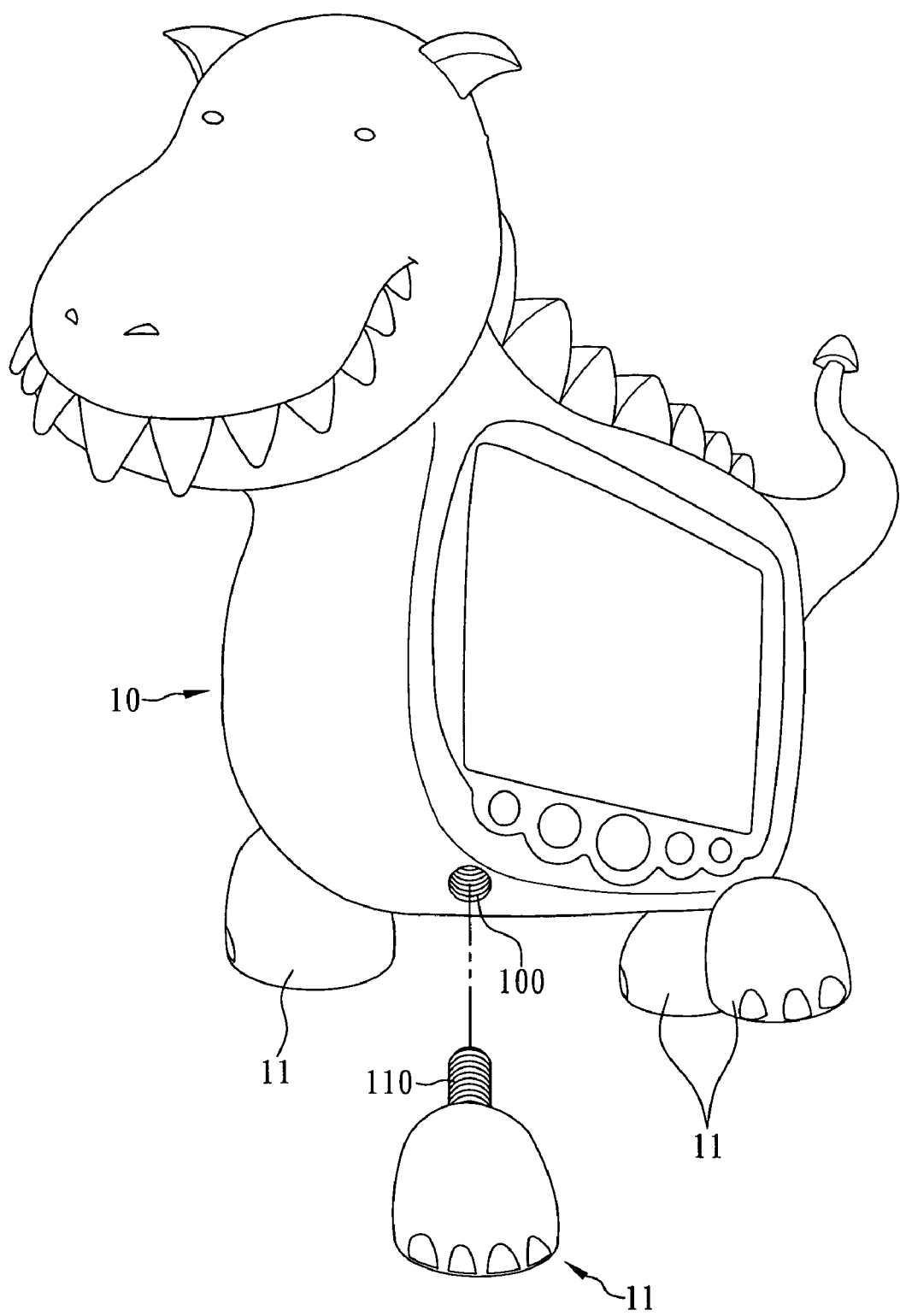
FIG. 1 is a schematic view of a conventional device with supports.
Figure 2:
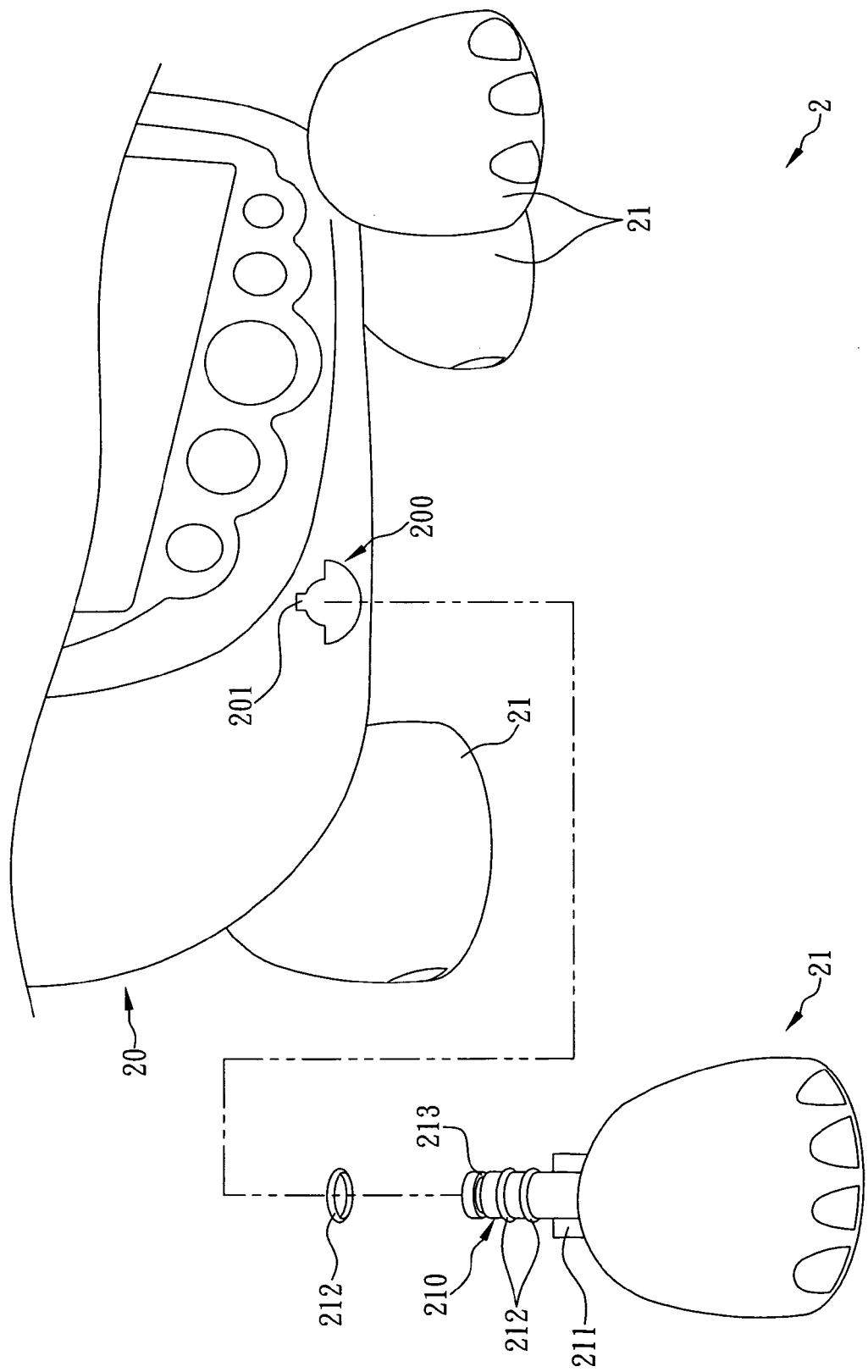
FIG. 2 is a schematic view of a device with connecting member having an elastic ring in accordance with a preferred embodiment of the present invention.

Referring to FIG. 2 for a schematic view of a device with connecting member having an elastic ring in accordance with a preferred embodiment of the present invention, the device is a display device or any other electronic device. In this preferred embodiment, the device 2 is a liquid crystal display and includes a body 20 and at least one connecting member 21, and the body 20 is a casing of the liquid crystal display and the connecting member 21 is a support of the liquid crystal display used for illustrating the present invention. The body 20 includes at least one accommodating cavity 200, each having an exhaust opening 201 disposed on an internal periphery of each accommodating cavity 200. Each connecting member 21 includes an insert unit 210 disposed at an end of the connecting member 21, at least one positioning block 211 disposed at the periphery of the insert unit 210, and at least one elastic ring 212 sheathed around the periphery of the insert unit 210, such that the shape of the insert unit 210 and each positioning block 211 can be inserted precisely into the accommodating cavity 200. If a user holds the connecting member 21 and align the insert unit 210 at a rim of the accommodating cavity 200 to insert the insert unit 210 into the accommodating cavity 200, the air in the accommodating cavity 200 will be compressed to enter the insert unit 210 and the air will be discharged through the exhaust opening 201, so that the insert unit 210 can be inserted into the accommodating cavity 200 successfully. Further, the connecting member 21 is securely inserted into the accommodating cavity 200 by each elastic ring 212 of the insert unit 210 to integrate the connecting member 21 with the body 20 as a whole. Further, users can use the positioning block 211 to assure a correction direction of assembling the body 20 with each connecting member 21.

With the present invention, manufacturer not only solve the issue of a difficult design of a traditional object with a connecting member, it overcomes the shortcomings of requiring to apply a sufficient force to keep screwing the connecting member in order to complete the assembling procedure and simplifies the assembling procedure, thus greatly enhancing the production and assembling efficiency, lowering the production cost, and improving the market competitiveness. Further, user can assemble the body 20 with each connecting member 21 or detach connecting member 21 from the body 20 easily and quickly, when it is necessary to replace or change the body 20 or the connecting member 21 for repair and maintenance. Obviously, the present invention can achieve the effect of improving the convenience for user to assemble or replace the body 20 and the connecting member 21.

Referring to FIG. 2, the insert unit 210 of the preferred embodiment further includes a concave edge portion 213 disposed at a position corresponding to each elastic ring 212, and the elastic ring 212 is accommodated in the concave edge portion 213, such that when a user holds the connecting member 21 and aligns the insert unit 210 at the rim of the accommodating cavity 200 to insert the insert unit 210 into the accommodating cavity 200, the elastic ring 212 produces a friction at the internal periphery of the accommodating cavity 200, but the elastic ring 212 can resist the friction effectively by means of the concave edge portion 213 and effectively prevent the elastic ring 212 from falling out or being displaced by the friction, and such arrangement can improve the life expectancy of the device 2 with a connecting member 21.

Figure 3:
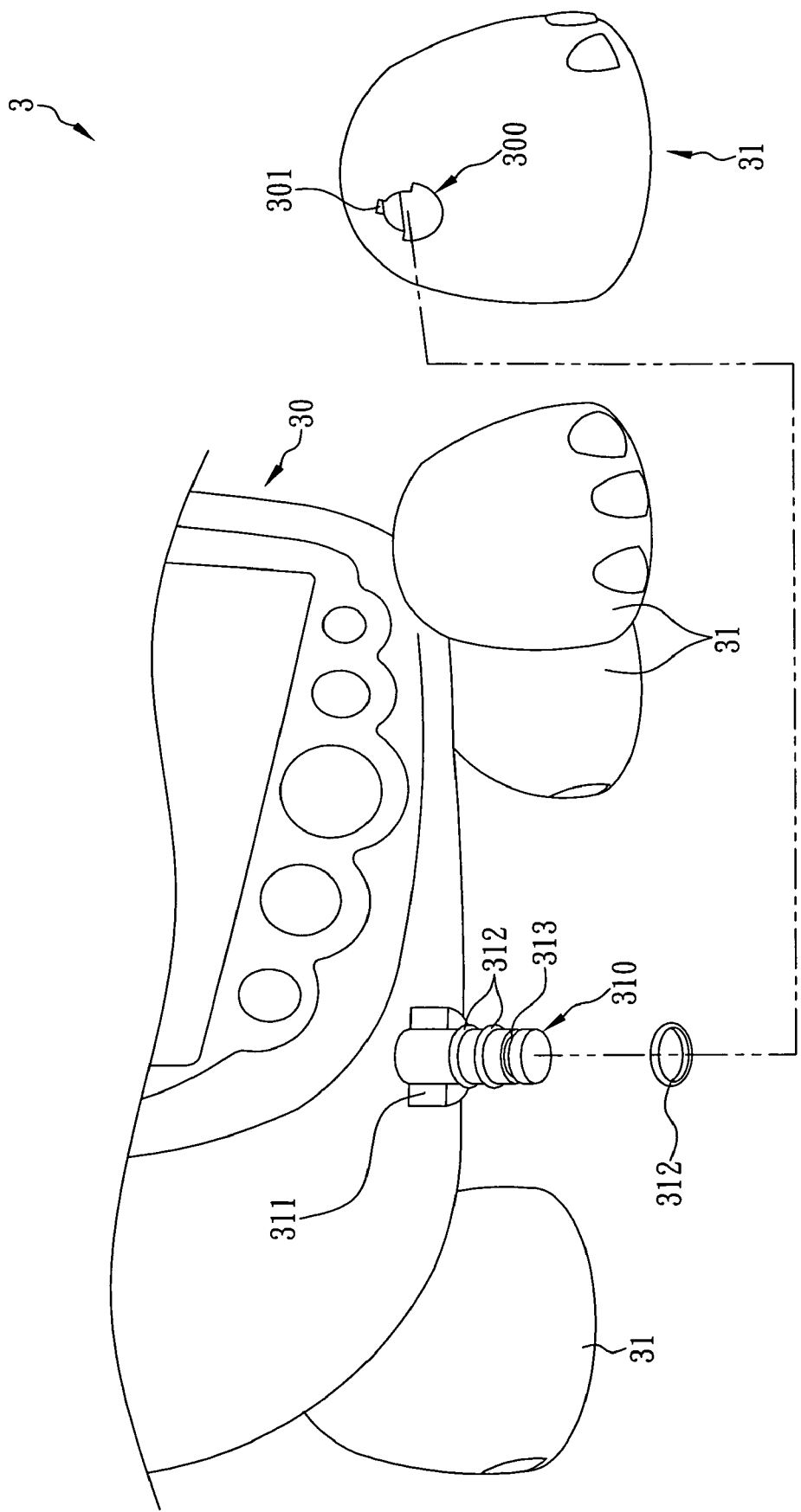
FIG. 3 is a schematic view of a device with connecting member having an elastic ring in accordance with another preferred embodiment of the present invention.

Referring to FIG. 3 for another preferred embodiment, the device 3 is a liquid crystal display and includes a body 30 and at least one connecting member 31, and the body 30 is a casing of the liquid crystal display, and the connecting member 31 is a support of the liquid crystal display, and the foregoing components are used as examples in this embodiment for illustrating the invention. The body 30 includes at least one insert unit 310, at least one positioning block 311 disposed at the periphery of the insert unit 310, and at least one elastic ring 312 sheathed around the periphery of the insert unit 310. Each connecting member 31 includes an accommodating cavity 300 disposed at an end of the connecting member 31, and an exhaust opening 301 disposed at the internal periphery of each accommodating cavity 300. The shape of the accommodating cavity 300 can accommodate the insert unit 310 and each positioning block 311 precisely, so that if a user holds the connecting member 31 and aligns the rim of the accommodating cavity 300 at the insert unit 310 to insert the insert unit 310 into the accommodating cavity 300, the air in the accommodating cavity 300 will be compressed to enter the insert unit 310 and be discharged through the exhaust opening 301, so that the insert unit 310 can be inserted into the accommodating cavity 300 successfully. Further, the connecting member 31 can be inserted into the accommodating cavity 300 through each elastic ring 312 of the insert unit 310 to integrate the connecting member 31 with the body as a whole. Further, users can assure the direction of assembling the body 30 with each connecting member 31 by the positioning block 311.

Therefore, user can assemble the device 3 with the connecting member 31 easily and quickly through the aforementioned assembling process and achieve the effect of replacing or changing the body 30 or each connecting member 31 of other stylish designs easily and quickly to provide users a convenient way of assembling or changing the body 30 and each connecting member 31. As to manufacturers, the device 3 with a connecting member 31 in accordance with the present invention not only solves the issue of a difficult design of the traditional device with a connecting member, but also overcomes the shortcomings of requiring users to apply a sufficient force to keep turning the connecting member in order to complete the assembling procedure of the device and simplify the assembling procedure, and thus greatly enhancing the production and assembling efficiency, lowering the production cost, and improving the market competitiveness.

Referring to FIG. 3, the insert unit 310 of this embodiment further includes a concave edge portion 313 disposed at a position corresponding to each elastic ring 312, and the elastic ring 312 is accommodated in the concave edge portion, such that if a user holds and aligns the connecting member 31 at the rim of the accommodating cavity 300 to the insert unit 310 to insert the insert unit 310 into the accommodating cavity 300, the elastic ring 312 will produce a friction at the internal periphery of the accommodating cavity 300, but the elastic ring 312 can effectively resist the friction by means of the concave edge portion 313 and properly prevent the elastic ring 312 from falling out from the insert unit 310 or being displaced by the friction. Obviously, the invention can improve the life expectancy of the device 3 with the connecting member 31.

The present invention has been described with preferred embodiments thereof and it is understood that many changes and modifications to the described embodiment can be carried out without departing from the scope and the spirit of the invention that is intended to be limited only by the appended claims.

What is claimed is:

1. A device with connecting member having an elastic ring, comprising:
   a body, having at least one accommodating cavity disposed thereon, and an exhaust opening disposed on the internal periphery of each accommodating cavity; and
   at least one connecting member, having an insert unit disposed at an end of each connecting member, at least one positioning block disposed at the periphery of the insert unit, and at least one elastic ring sheathed onto the periphery of the insert unit, such that when the connecting member is inserted into the accommodating cavity, the shape of the accommodating cavity can accommodate the insert unit and each positioning block precisely.

2. The device with connecting member having an elastic ring according to claim 1, wherein the insert unit is disposed at a position corresponding to each elastic ring and includes a concave edge portion disposed around the insert unit, and the elastic ring is contained in the concave edge portion.

3. The device with connecting member having an elastic ring according to claim 2, wherein the device is a liquid crystal display.

4. The device with connecting member having an elastic ring according to claim 3, wherein the body is a casing of the liquid crystal display.

5. A device with connecting member having an elastic ring, comprising:
   a body, having at least one insert unit disposed thereon, at least one positioning block disposed at the periphery of the insert unit, and at least one elastic ring sheathed around the periphery of the insert unit; and
   at least one connecting member, having an accommodating cavity disposed at an end of each connecting member, and an exhaust opening disposed on an internal periphery of each accommodating cavity, such that when the connecting member is inserted into the accommodating cavity, the shape of the accommodating cavity can accommodate the insert unit and each positioning block precisely.

6. The device with connecting member having an elastic ring according to claim 5, wherein the insert unit is disposed at a position corresponding to the position of each elastic ring and includes a concave edge portion disposed around the insert unit and the elastic ring is contained in the concave edge portion.

7. The device with connecting member having an elastic ring according to claim 6, wherein the device is a liquid crystal display.

8. The device with connecting member having an elastic ring according to claim 7, wherein the body is a casing of the liquid crystal display.

* * * * *